(12) United States Patent
Hyder et al.

(10) Patent No.: US 6,633,929 B1
(45) Date of Patent: Oct. 14, 2003

(54) METHOD AND SYSTEM FOR ABSTRACTING NETWORK DEVICE DRIVERS

(75) Inventors: Jameel Hyder, Redmond, WA (US); Mark R. Sestak, Kirkland, WA (US); Kenneth G. Richards, Renton, WA (US); Thomas W. Green, Redmond, WA (US); John N. Fuller, Bothell, WA (US); Georgios Chrysanthakopoulos, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/302,735

(22) Filed: Apr. 30, 1999

(51) Int. Cl.$^7$ ................................................. G06F 13/38
(52) U.S. Cl. ........................... 710/62; 710/8; 710/63; 709/315; 709/332
(58) Field of Search ........................... 709/315, 331, 709/332; 710/62, 63, 65, 8

(56) References Cited

U.S. PATENT DOCUMENTS

| | | | | |
|---|---|---|---|---|
| 5,566,331 A | * | 10/1996 | Irwin et al. | 707/10 |
| 5,727,212 A | * | 3/1998 | Dinallo | 709/321 |
| 6,202,147 B1 | * | 3/2001 | Slaughter et al. | 709/327 |
| 6,226,719 B1 | * | 5/2001 | Minow | 711/112 |

* cited by examiner

Primary Examiner—Jeffrey Gaffin
Assistant Examiner—Harold Kim
(74) Attorney, Agent, or Firm—Workman, Nydegger

(57) ABSTRACT

Methods, systems, and computer program products for abstracting device driver development by layering certain functionality. A driver layer encapsulates device commands and data within a format that is independent of the type of connection between the device and a host computer. Once encapsulated, the device commands and data pass through an intermediate layer responsible for transferring the encapsulated device commands and data to a connection-specific layer. The connection-specific layer then places the encapsulated device commands and data on the particular connection that couples the device and host computer. A single driver layer, potentially provided by an operating system, can thus operate a plurality of devices. Accordingly, hardware developers can be freed from the burden of writing the numerous host-based device drivers that are otherwise required to support an increasing number of connections between devices and host computers, specifically exemplified by improved bus and networking technologies.

21 Claims, 6 Drawing Sheets

METHOD AND SYSTEM FOR ABSTRACTING NETWORK DEVICE DRIVERS

BACKGROUND OF THE INVENTION

1. The Field of the Invention

The field of the present invention is the development of drivers for computer hardware. More specifically, the present invention relates to methods, systems, and computer program products for abstracting computer hardware device drivers.

2. The Prior State of the Art

Personal computers, unlike proprietary computer systems, are fabricated with widely available components. In a typical personal computer, various manufacturers are responsible for producing the components that are present. For example, it is not uncommon that a personal computer's processor, motherboard, hard disk, CD-ROM, disk controller, video processing, audio processing, modem, network interface, keyboard, mouse, etc. are each manufactured by a separate entity. Alternatively, at times it may be advantageous to combine several pieces of hardware into a single device. A motherboard may integrate video processing, audio processing, and a disk controller as well as keyboard and mouse interfaces. Nevertheless, a basic philosophy of personal computers is the ability to upgrade, to replace an old component or to add a new one. Even computers with heavily integrated motherboards offer the option of adding new hardware.

Traditionally, new hardware is added to a personal computer through a peripheral bus on the motherboard. Hardware connected to the peripheral bus may be replaced as it becomes obsolete or inoperable. To facilitate the manufacturing of computer hardware, several standards have emerged for peripheral buses, including ISA, ESDI, PCI, SCSI, and others. Hardware from any manufacturer that conforms to a peripheral bus standard may be connected to the peripheral bus for use by the personal computer. This concept of being able to connect hardware designed by any one of several competing manufacturers through a peripheral bus is referred to generally as an open architecture.

Traditionally, peripheral buses have required removing a personal computer's case to gain access, presenting at least two problems. First, many consumers lack the knowledge and confidence necessary to open a personal computer's case and connect a hardware device. Therefore, it is not uncommon for a device purchaser to make a support call for no other reason than to have a support representative reassure the purchaser as he or she follows steps listed in printed documentation included with the device. Second, some consumers may not even consider opening their computer, preferring instead to have the work performed by an expert. Thus, consumers may resist upgrading their computer equipment, either from a fear of causing damage or from the added expense of paying another for the installation. In either case, the need to open a computer case will likely limit the market for some hardware devices.

In contrast, traditional external modems offer the convenience of being easily attached to a personal computer's external serial port. Unfortunately, such connections tend to be slow, especially given the increasingly image-oriented content of the World Wide Web. The problem is three fold, slow serial ports connecting slow modems connected to slow telephone lines. Nevertheless, installation is relatively easy and the cost of Internet access is controlled by fierce competition among Internet service providers ("ISPs"). However, as high-speed networking and communication enters the realm of home-based personal computers, the demand for faster devices that can be connected without opening a computer's case is increasing.

In response to this increasing demand, two new external buses have been developed to overcome the performance limitations inherent in serial port connections, the universal serial bus ("USB") and the 1394 bus ("1394"). These buses are highly attractive to those who would provide high-speed digital lines for home use. With buses like USB and 1394, a line provider has increased confidence that investments in bringing digital access to the home will reach a market larger than consumers willing to open their computer cases or those willing to pay someone else for installing new hardware. Installation becomes a matter of plugging devices into an external computer socket.

Similarly, cable modems are ideally suited to USB and 1394. A cable provider can ship a modem to a customer who only needs make a few connections. This arrangement eliminates liability, increased expense, or potential mistrust that may develop from sending out a technician to install a modem that would otherwise require opening the computer case. Manufacturers sell more modems, cable providers increase their customer base. However, device manufacturers face a significant hurdle in their effort to supply devices in an environment of increasingly diverse buses, whether they are internal or external.

In addition to a physical connection, software drivers must be written to make a connected hardware device accessible to the application programs executing on a personal computer. Just as a peripheral bus standard provides a common means for accessing a particular bus, a device driver provides a common means for accessing a particular device. Thus, device drivers generally have been written to access a given hardware device connected to a given bus, with each supported bus requiring a separate device driver.

Although the potential number of buses may not seem like much of an impediment to hardware manufacturers writing device drivers, the problem is not as simple as one driver for each bus. First, various operating systems for personal computers offer incompatible support for writing device drivers. Therefore, the number of buses must be multiplied at least by the number of supported operating systems to determine the how may device drivers are required. Second, as new technology becomes available, a new driver must be written to make use of those advances. A new driver may be required even for minor enhancements. Naturally, writing, testing, and supporting a large number of device drivers demands a significant commitment of resources.

However, in many respects the effort to support multiple device drivers is entirely duplicative. For example, much of the functionality needed to interface with network and other communication devices is independent of the particular bus used to connect the network device. Thus, the only portion of a network device driver that must be unique is the part that communicates directly with a particular bus or network. This is true for a single manufacturer who offers multiple network devices as well as for the industry producing network devices as a whole. Not only is the effort substantial to produce a network device driver for each peripheral bus/revision/operating system permutation, but that effort is largely wasted.

Operating system providers share this problem with hardware developers because they must include network device drivers from many manufacturers in order for the operating system to be useful. Although the operating system provider may not bear primary responsibility for testing network device drivers, some degree of functionality with at least some number of network device drivers must be examined to assure the operating system will run properly when installed on a personal computer. Furthermore, significant resources must be dedicated to coordinating the release of an operating system with the enormous number of network device drivers that are written.

SUMMARY OF THE INVENTION

The foregoing problems in the prior state of the art have been successfully overcome by the present invention, which is directed to methods, systems, and computer program products for abstracting computer hardware device drivers. The invention is particularly useful in reducing the burden hardware developers otherwise experience in producing network device drivers, where each driver must be specific to the particular peripheral bus used to connect the network device. For example, as USB, 1394, and other peripheral bus standards proliferate to meet the growing demand for easier access to high-speed networking and communication, the present invention allows for a core set of host-based drivers provided by the operating system rather than individual hardware developers.

According to one aspect of the invention, a software implemented message set and mechanism for networking and communication devices connected to a host computer through a bus (e.g. PCI, USB, or 1394) or a network (e.g. Internet Protocol) is provided. The message set, identified as Remote Network Driver Interface Specification or Remote NDIS, allows a host computer to send connected devices data and commands without knowing specific details regarding the bus or network used to connect the device. In contrast, NDIS itself only defines a protocol for configuring network devices, sending network data, and receiving network data on behalf of other applications executing on a host computer. NDIS necessarily requires some adaptation for individual buses or networks.

Drivers for devices that support remote NDIS, termed remote NDIS devices, include an upper layer that is independent of any particular bus or network. Transport functionality that is specific to individual buses or networks is implemented in lower remote NDIS driver layers, written specifically for a particular bus or network. However, by specifying a standard message set and mechanism for passing data and commands to a remote NDIS device, the operating system can provide these host-based drivers, freeing hardware developers to more fully concentrate resources on the functionality of their devices.

More specifically, one aspect of the invention includes a remote NDIS miniport layer that encapsulates device data and commands into data structures that can be passed without modification to a networking device. These data structures, referred to as remote NDIS messages, can then be passed to one or more bus or network-specific layers that understand the particular bus or network connecting the remote NDIS device. For example, an intermediate bus or network-specific layer, known as a bus microport, may take remote NDIS messages and pass them to a lower bus or network-specific layer that is capable of transferring the messages to a particular bus or network.

In addition to reducing the number of host-based drivers required to support networking devices, remote NDIS also isolates network functionality from the bus-specific portion of a driver. Therefore, extensions can be made to networking features without impacting bus- or network-specific transport layers. Moreover, this isolation is available on both the remote NDIS device as well as the remote NDIS host. By addressing these issues, remote NDIS provides for more rapid deployment of networking and communication devices at a lower cost.

Further features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other advantages and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The present invention abstracts device drivers into functional layers. In a networking context, one embodiment includes a layer that encapsulates data and commands into a bus- nor network-independent format and one or more physical transport layers that are specific to a particular bus or network. The physical transport functionality may be accomplished by having an intermediate layer receive encapsulated data and commands and pass them on to a layer that implements the details of a specific bus or network. This layered approach separates network functionality from bus- or network-specific layers, allowing each to change independently of the other. Furthermore, by establishing a standard format for device commands and data, an operating system may provide the host-based drivers for any devices that conform to the standard. Thus, device manufactures are no longer required to write, test, and support host-based drivers for their hardware and operating system providers can eliminate the need to coordinate distributing separate device drivers for each piece of hardware that may be attached to a host computer.

The invention is described below by using diagrams to illustrate either the structure or processing of embodiments used to implement the systems and methods of the present invention. Using the diagrams in this manner to present the invention should not be construed as limiting of its scope. The present invention contemplates both methods and systems for abstracting computer hardware device drivers. The embodiments of the present invention may comprise a special purpose or general purpose computer including various computer hardware, as discussed in greater detail below.

Embodiments within the scope of the present invention also include computer-readable media having computer-executable instructions or data structures stored thereon. Such computer-readable media may be any available media which can be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium which can be used to store the desired computer-executable instructions or data structures and which can be accessed by a general purpose or special purpose computer. When information is transferred or provided over a network or another communication connection to a computer, the computer properly views the connection as a computer-readable medium. Thus, such a connection is also properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
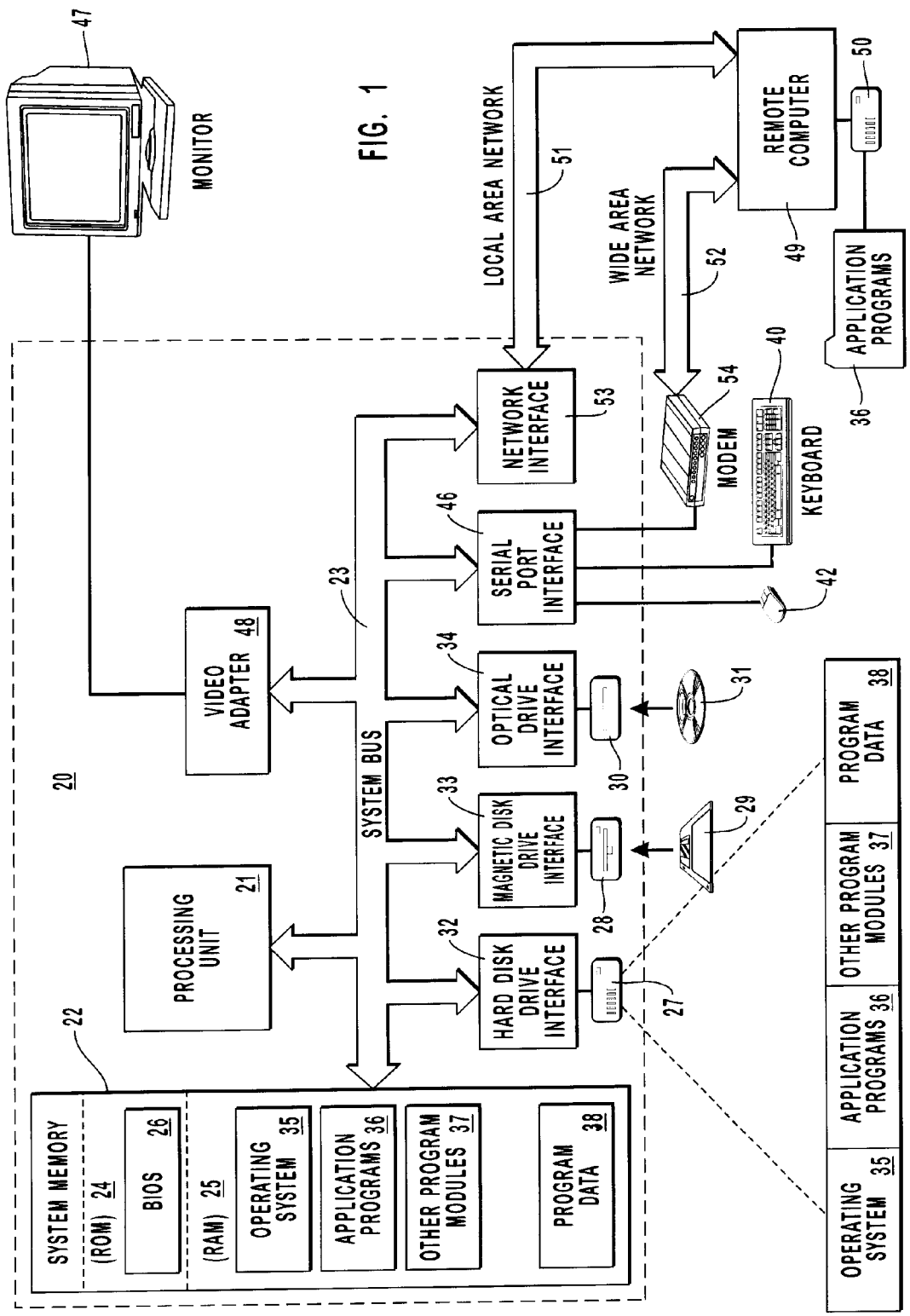
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked through a communication network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk, not shown, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk, a removable magnetic disk 29 and a removable optical disk 31, other types of computer readable media for storing data can be used, including magnetic cassettes, flash memory cards, digital video disks, Bernoulli cartridges, RAMs, ROMs, and the like.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communication over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communication link between the computers may be used.

Figure 2:
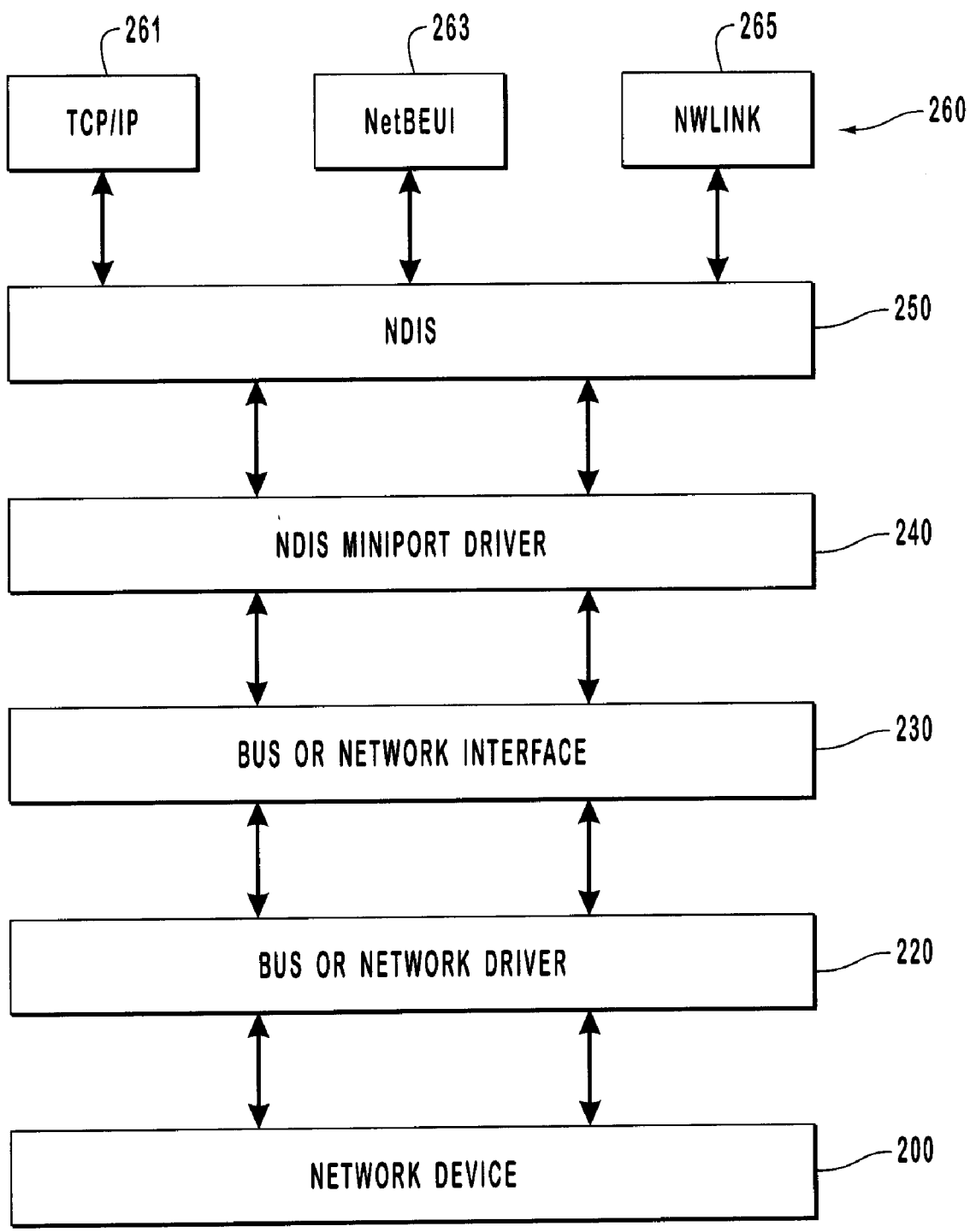
FIG. 2 illustrates the functional components of a network device driver implemented without practicing the present invention.

In order to help provide context, reference is next made to FIG. 2, which illustrates the functional components of a network device driver that does not take advantage of the present invention. It is common in the art of network communication to conceptually divide the flow of data between a software application and a network into functional layers. The most basic functions, such as putting data bits onto a network cable, are performed at the bottom layers, whereas functions attending to the details of a particular software application reside at the top layers. Essentially, the purpose of each layer is to provide some functionality to the next higher layer while shielding the higher layer from the details of how that functionality is actually implemented in the lower layers. Most of the discussion that follows concentrates on describing how data moves from higher layers to lower layers. However, those skilled in the art will recognize that information moves between layers in both directions and that each layer has mechanisms for communicating with adjacent layers in the appropriate format. Thus, a layer that manipulates or transforms data as it moves through the layer in one direction, reverses that manipulation or transformation on data that moves in the opposite direction.

The layers presented in FIG. 2 include a transport protocol layer 260, having TCP/IP 261, NetBEUI 263, and NWLINK 265 depicted as examples, NDIS layer 250, NDIS miniport driver 240, bus or network interface 230, bus or network driver 220, and network device 200. Of particular significance is NDIS layer 250. NDIS or the Network Driver Interface Specification provides a layer of abstraction for the development of network device drivers. The abstraction comprises an application programming interface or API to functionally identify the services provided by NDIS without requiring knowledge of NDIS's implementation details, thus providing a device-independent format for commands and data that are passed to a device. Specifically, NDIS layer 250 is responsible for configuring network devices as well as for sending and receiving network data on behalf of applications running on the host computer. These applications pass information to NDIS through a transport protocol that is appropriate for the type of data exchanged and the underlying network used for transmission, such as TCP/IP 261, NetBEUI 265, NWLINK 265, etc. or through other, media-aware, protocols that may occupy layer 260. In turn, NDIS communicates with lower driver layers through NDIS object identifiers or OIDs to perform device configuration and call management; data is exchanged with lower driver layers in the form of NDIS data packets.

One important advantage of communication through well-defined, standard layers, such as transport protocol layer 260 and NDIS layer 250 is that application software developers can write network-based programs without detailed knowledge of the hardware responsible for network functionality. Operating system developers can provide transport protocol layer 260 and NDIS layer 250 as services provided natively by the operating system to simplify the installation of network-based software. Moreover, because these layers define standard services, only a single instance of each layer is necessary for providing the services to multiple applications and/or multiple hardware devices.

In the absence of the present invention, hardware manufacturers are required to write two drivers, NDIS miniport driver 240 and bus or network interface 230. However, the two drivers may be distributed as a single binary. The first driver, NDIS miniport driver 240, exchanges information with NDIS and communicates with the bus or network interface driver 230 through some vendor-specific API. Bus or network interface driver 230 is bus- or network-specific and communicates with hardware through the appropriate bus or network driver 220. NDIS miniport driver 240 and bus or network interface driver 230 communicate through a vendor-specific API because both drivers are written by the manufacturer of the network device 200 being accessed. Therefore, while NDIS miniport 240 must conform to the NDIS API in order to communicate with NDIS layer 250, and bus or network interface 230 must conform to the appropriate bus or network driver 220 in passing information to network device 200, the interaction between NDIS miniport 240 and bus or network interface 230 is completely at the discretion of the hardware manufacturer.

Requiring device manufacturers to write two drivers for each piece of equipment they market presents some fairly serious problems, as previously noted. For example, the sheer number of device drivers is difficult and expensive to manage, both for the hardware manufacturer and for operating system developers who may distribute certain device drivers with their software. Furthermore, since manufacturers provide both the connection to NDIS and the bus or network interface, the network functionality and the specifics of a particular bus are likely to be coupled, making it impossible to update one without the other. Solving these problems will allow for faster deployment of remotely connected networking devices and lower costs for developing host-based drivers.

Although the embodiments described below are directed toward networking devices, the principles of the present invention have broad application. Therefore, the selection of networking devices as an environment for the present invention should be viewed as illustrative rather than as a limitation.

Figure 3:
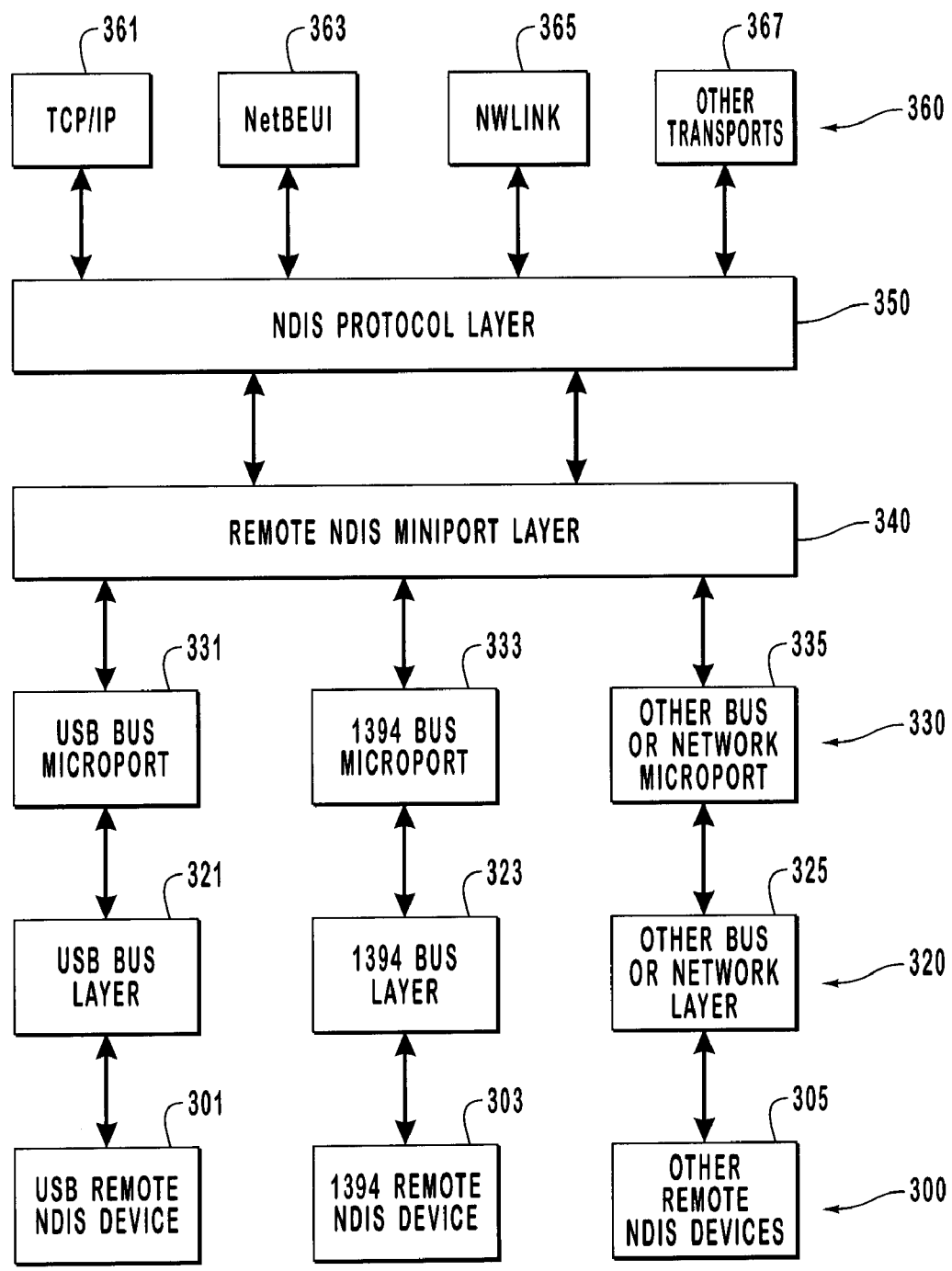
FIG. 3 illustrates the functional components of a layered communication or network device driver according to one embodiment of the present invention.

In contrast to FIG. 2, FIG. 3 illustrates the functional components of a network device driver that takes advantage of the present invention. More specifically, FIG. 3 replaces the NDIS miniport driver 240 and bus or network interface 230 of FIG. 2, both of which were provided by the device hardware manufacturer, with remote NDIS miniport layer 340 and bus- or network-specific microports generally designated as 330. Remote NDIS miniport layer 340 and bus- or network-specific microports 330 are independent of the particular device being accessed and therefore can be included as part of the operating system in a similar manner as transport protocols 360, NDIS protocol layer 350 and bus or network layer 320 are native to the operating system. Therefore, hardware manufacturers writing to the remote NDIS specification are no longer required to write host-based drivers for their devices.

Remote NDIS defines a connection-agnostic or connection-independent message set along with a description of how the message set operates over a particular connection, such as a specific bus or network. Because the remote NDIS interface is standardized, a core set of host drivers can support any number of attached networking devices, thereby improving system stability and user satisfaction because no new drivers must be installed to support a new network device. The remote NDIS architecture includes a remote NDIS miniport driver 340 that understands the remote NDIS message set and communicates with bus- or network-specific microport drivers 330, such as USB bus microport 331, 1394 bus microport 333, or other bus or network microport 335. Specifically, remote NDIS miniport layer 340 encapsulates NDIS OIDs and NDIS data packets into data structures that can be passed without modification to a networking device. The data structures are known as remote NDIS messages. Remote NDIS miniport layer 340 is an example of means for encapsulating device commands and data.

The bus- or network-specific microport drivers 330 represent a intermediate layer that understands the bus or network responsible for passing the messages onto the device. Thus, microport layer 330 receives the remote NDIS messages and passes them to the corresponding element of bus or network driver layer 320, namely, USB bus layer 321, 1394 bus layer 323, or other bus or network layer 325. Bus or network driver layer 320 then passes the remote NDIS message to remote NDIS devices 300. USB bus microport 331, 1394 bus microport 333, and other bus or network microport 335 are each examples of means for receiving and/or transferring encapsulated device commands to a connection-specific driver layer such as USB bus layer 321, 1394 bus layer 323, and other bus or network layer 325.

Because network protocol mechanisms are abstracted above the bus or network-specific microport layer 330, adding new network functionality can be accomplished by changing only the remote NDIS miniport layer 340. Microport layer 330 remains unchanged because it is merely a message transport mechanism that passes NDIS OIDs and NDIS data packets encapsulated in remote NDIS messages. Furthermore, adding network functionality in the form of new NDIS OIDs is available to all bus or network microports 330 because a single remote NDIS miniport layer 340 serves them all. The present invention also maintains backward compatibility. As new NDIS OIDs are added, a remote NDIS device 300 may respond that it does not understand the NDIS OID and therefore does not support the new network functionality.

For example, if TCP/IP 361 needs to access a network resource represented by 1394 remote NDIS device 303, the following occurs. TCP/IP 361 calls the NDIS protocol layer 350 through the NDIS API. NDIS protocol layer 350 produces NDIS OIDs and/or NDIS data packets in response to the NDIS API call and passes them to remote NDIS miniport layer 340. Remote NDIS miniport layer 340 encapsulates the NDIS OIDs and NDIS data packets it receives into remote NDIS messages and passes them to 1394 bus microport 333, because the device being contacted is attached by a 1394 bus. The 1394 bus microport 333 receives the remote NDIS messages and passes them to the 1394 bus layer 323 which in turn passes them to 1394 remote NDIS device 303. 1394 remote NDIS device 303 fulfills the TCP/IP 361 request through the same chain in reverse order. TCP/IP 361, NetBEUI 363, NWLINK 365, and other transports 367 each access USB remote NDIS device 301, 1394 remote NDIS device 303, and other remote NDIS devices 305 in a similar manner.

Figure 4:
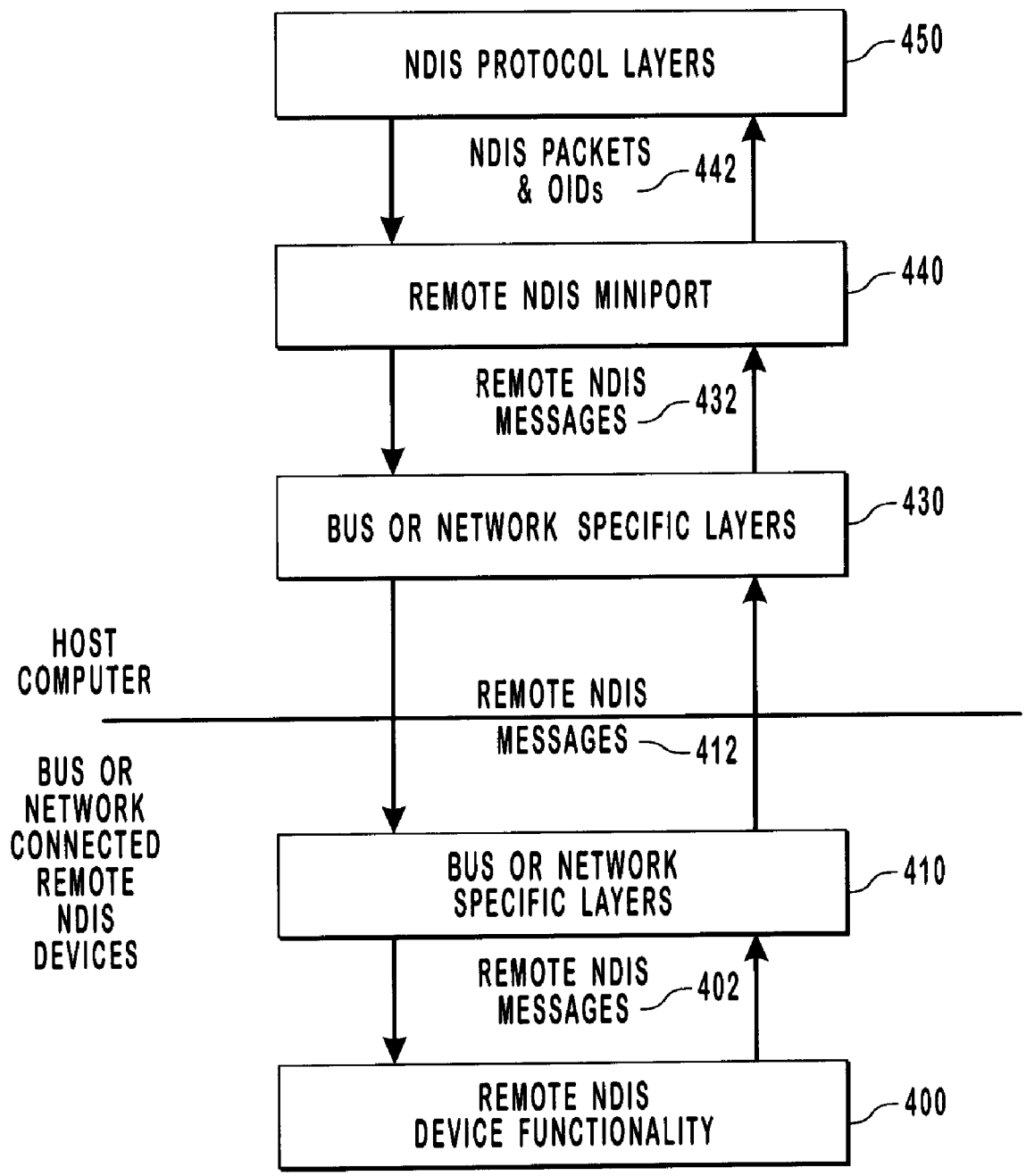
FIG. 4 illustrates the type of information passed between the layers of a communication or network device driver according to one embodiment of the present invention.

The details of how remote NDIS functions with a 1394 bus are presented below in the discussion of FIG. 6. The discussion below of FIG. 5 describes remote NDIS working with a USB bus. However, prior to the details of FIGS. 5 and 6, the general concepts depicted in FIG. 4 will be further disclosed. FIG. 4 illustrates the type of information passed between the host-based layers of a communication or network device driver and layers that may be present at the remote NDIS device according to a preferred embodiment of the present invention.

The layers of a host-based driver include NDIS protocol layers 450, remote NDIS miniport 440, and bus or network-specific layers 430. A remote NDIS device may also layer its device-based driver into bus- or network-specific layers 410 and remote NDIS device functionality 400. Each layer may be appropriately labeled in the plural to indicate that some additional divisions may be appropriate. For example, the bus or network-specific layers 430 of FIG. 4 can be divided into an intermediate microport layer 330 and a bus layer 320 as shown in FIG. 3. Conversely, several of the functional layers presented may be combined without contravening the principles of the present invention. In general, arrangements other than the functional layers of FIG. 4 are contemplated and within the scope of the present invention. Nevertheless, to facilitate discussing the general functions performed by each layer as a whole, the description proceeds without reference to additional sub-layers.

The benefits associated with the host-based drivers of the present invention may also be realized in the hardware devices themselves. Hardware developers can maintain a core set of message transport mechanisms for each bus or network they support, as shown in bus or network-specific layers 410. These layers are independent of networking commands and data that correspond to NDIS OIDs and NDIS data packets received by the device in the form of remote NDIS messages. Therefore, changes in network functionality can be transparent to bus or network-specific layers 410, and only a single driver-based layer needs to be written for each supported bus or network.

Remote NDIS messages may then be handled by the remote NDIS device functionality layers 400. Because the functionality is implemented apart from the bus- or network-specific transport mechanism, hardware developers can maintain a common code base implementing network functionality independent of specific networks or buses. Furthermore, as new functionality is added to devices, the functionality appears at remote NDIS device functionality layers 400, allowing the hardware developer to address these new features across each bus or network supported by bus- or network-specific layers 410. Thus, if a hardware developer has invested resources in writing a bus- or network-specific layer for a USB bus, a 1394 bus, and a PCI bus, any network functionality added to remote NDIS device functionality 400 is available to devices manufactured for each of the named buses.

FIG. 4 also shows the type of information that is passed between various driver layers on both the host and device side. NDIS protocol layers 450 exchange NDIS data packets and NDIS OIDs 442 with remote NDIS miniport 440. Remote NDIS miniport 440 translates between NDIS OIDs, NDIS data packets, and remote NDIS messages, exchanging only remote NDIS messages 432 with bus- or network-specific layers 430. In moving information across the host/device boundary, bus or network-specific layers 430 of the host exchange remote NDIS messages 412 with bus- or network-specific layers 410 of the device. Finally, bus- or network-specific layers 410 exchange remote NDIS messages 402 with remote NDIS device functionality layers 400, where the remote NDIS messages may be translated back into NDIS OIDs and NDIS data packets.

From the perspective of any particular layer, it appears as if the particular layer is communicating with adjacent layers in the format of the particular layer. For example, NDIS protocol layers 450 seem to be communicating with remote NDIS device functionality 400 through NDIS data packets and NDIS OIDs. However, remote NDIS miniport sees the communication as though it occurs through remote NDIS messages. As stated earlier, each layer shields other layers from the details of the services it offers. Thus, the remote NDIS miniport 440 does not need to know anything about the bus or network to which the device is connected. Furthermore, the bus- or network-specific layers 430 do not need to know anything regarding the networking protocols that are exchanging NDIS OIDs and NDIS data packets with the device. Similarly, remote NDIS device functionality 400 operates as though it were communicating directly with the NDIS protocol layers through remote NDIS messages.

Figure 5:
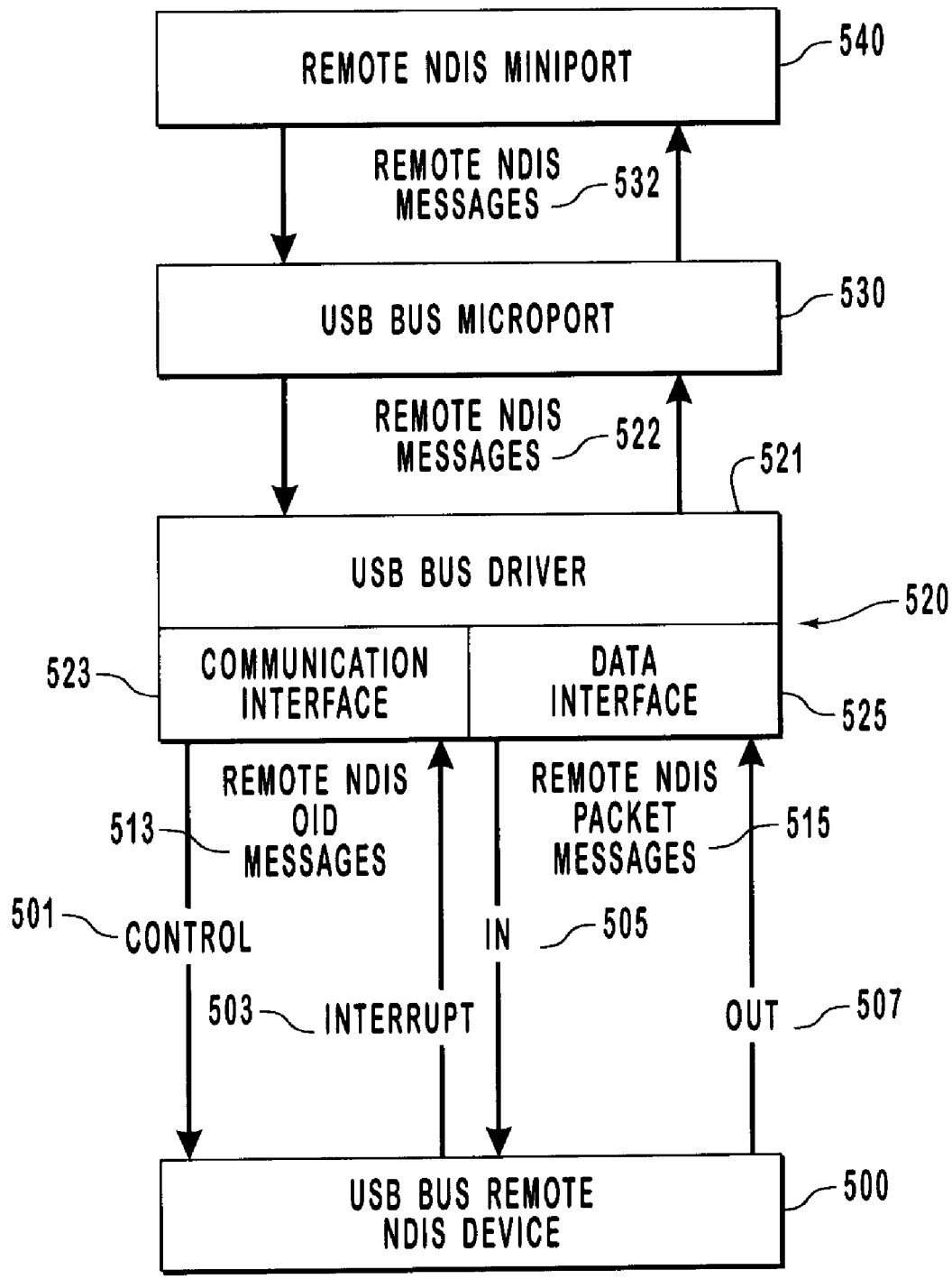
FIG. 5 illustrates a USB bus implementation of a communication or network device driver according to one embodiment of the present invention.

Turning next to FIG. 5, a USB bus embodiment of a communication or network device driver of the present invention is illustrated. The layers shown are functional in nature and may not have a one-to-one correspondence with the computer executable files implementing the invention. For example, reference 520 may include one executable for managing the remote NDIS messages to be transferred (e.g., communication interface 523 and data interface 525) and another executable for interacting with the physical USB bus. Conversely, a single executable file may span the functionality presented as a single layer in FIG. 5. Therefore, executable file divisions other those corresponding to the functional layers of FIG. 5 are contemplated and within the scope of the present invention.

In the USB bus embodiment shown in FIG. 5, remote NDIS miniport 540 passes remote NDIS messages 532 of encapsulated NDIS OIDs and data packets to USB bus microport 530. USB bus microport 530 is specific to the USB bus; it passes remote NDIS messages 522 to the appropriate interfacing provided by USB bus driver 521. For example, remote NDIS messages that encapsulate NDIS OIDs 513 are exchanged with the communications interface 523 of USB bus driver 521. In contrast, remote NDIS messages that encapsulate NDIS data packets 515 are exchanged with the data interface 525 of USB bus driver 521. Collectively, USB bus driver 521, communication interface 523, and data interface 525 are designated by reference 520 to provide some level of correspondence with similarly numbered elements in other figures.

USB bus driver 521 communicates with USB bus remote NDIS device 500 over the USB bus through a system of pipes. Various pipes are grouped together to form an interface. Specifically, control pipe 501 and interrupt pipe 503 are part of communication interface 523, whereas in pipe 505 and out pipe 507 are grouped with the data interface 525. Communication interface 523 exchanges remote NDIS OID messages with USB bus remote NDIS device 500. USB bus driver 521 sends remote NDIS OID messages 513 through control pipe 501 and receives remote NDIS OID messages 513 through interrupt pipe 503. Data interface 525 exchanges remote NDIS data packet messages with USB bus remote NDIS device 500. USB bus driver 521 sends remote NDIS data packet messages 515 through in pipe 505 and receives remote NDIS data packet messages 515 through out pipe 507.

Figure 6:
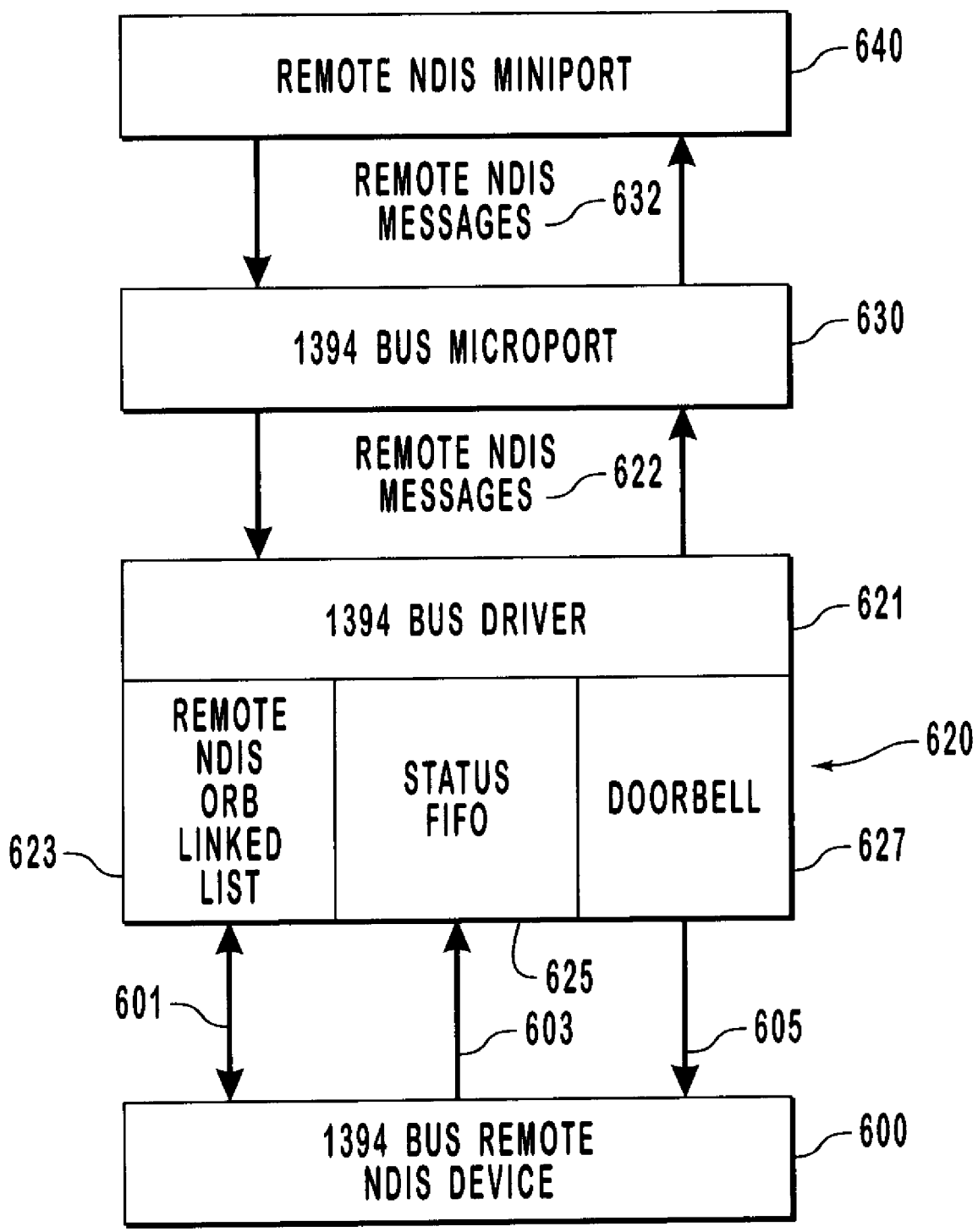
FIG. 6 illustrates a 1394 bus implementation of a communication or network device driver according to one embodiment of the present invention.

FIG. 6 illustrates a 1394 bus embodiment of a communication or network device driver according to the present invention. As in FIG. 5, the layers shown in FIG. 6 are also functional in nature and may not have a one-to-one correspondence with the computer executable files implementing the invention. In a preferred embodiment, reference 620 includes one executable for managing the remote NDIS messages to be transferred (comprising the serial bus protocol 2 functionality described below) and another executable for interacting with the physical 1394 bus. Conversely, a single executable file may span the functionality presented as a single layer in FIG. 6. Therefore, executable file divisions other those corresponding to the functional layers of FIG. 6 are contemplated and within the scope of the present invention.

As shown in FIG. 6, remote NDIS miniport 640 exchanges remote NDIS messages 632 with 1394 bus microport 630. 1394 bus microport 630 is specific to the 1394 bus; it passes remote NDIS messages 622 to the serial bus protocol 2 or SBP-2 mechanisms provided by 1394 bus driver 621. 1394 bus driver 621 uses SBP-2 operation request blocks, or ORBs, to exchange remote NDIS messages with 1394 bus remote NDIS device 600. Specifically, remote NDIS ORB linked list 623 is a linked list or one or more remote NDIS messages. 1394 bus driver 621 uses doorbell 627 to notify 1394 bus remote NDIS device that remote NDIS ORB linked list 623 contains remote NDIS messages to be used or processed by the device. Similarly, 1394 bus remote NDIS device 600 notifies upper layers of certain asynchronous events through 1394 bus driver using status FIFO 625. Communication lines 601, 603, and 605 represent the flow of information between remote NDIS ORB linked list 623, status FIFO 625, doorbell 627 and 1394 bus remote NDIS device 600. Collectively, 1394 bus driver 621, remote NDIS ORB linked list 623, status FIFO 625, and doorbell 627 are designated by reference 620 to provide some level of correspondence with similarly numbered elements in other figures.

For example, 1394 bus remote NDIS device 600 may need to communicate a change in device or network status. A change in status is delivered to 1394 bus driver 621 using the same remote NDIS ORB linked list 623 that delivers remote NDIS messages. The 1394 bus remote NDIS device 600 signals 1394 bus driver 621 by writing to the status FIFO 625. When 1394 bus driver 621 has a remote NDIS ORB linked list 623 waiting for the status change message, it rings doorbell 627 to inform 1394 bus remote NDIS device 600 of the available ORB.

Device responses to remote NDIS messages are handled in a similar fashion. The 1394 bus remote NI)IS device 600 writes to the status FIFO 625 when it has a response to a previously received remote NDIS message. Once 1394 bus driver 621 has an ORB available in remote NDIS ORB linked list 623, the driver rings doorbell 627 to inform 1394 bus remote NDIS device of the waiting ORB. This procedure of obtaining ORBs for passing remote NDIS messages to 1394 bus driver 621 is also followed for remote NDIS data packets destined for the bus driver. The 1394 bus remote NDIS device 600 signals 1394 bus driver 621 of the need for ORBs in remote NDIS ORB linked list 623 by writing to status FIFO 625 and 1394 bus driver 621 notifies 1394 bus remote NDIS device 600 that the ORBs are available by ringing doorbell 627.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method of simplifying device driver development for a device connected to a host computer, the method comprising the steps of:

establishing a first driver layer to perform at least the steps of:
  receiving device commands and data; and
  encapsulating the device commands and data within a format that is independent of a connection between the host computer and the device, thereby enabling the encapsulated device commands and data to be used without modification to the device; and
establishing a second driver layer to perform at least the steps of:
  receiving the encapsulated device commands and data from the first driver layer; and
  passing the encapsulated device commands and data, without modification, to a driver layer that is specific to the connection between the host computer and the device.

2. A method as defined in claim 1, wherein the first driver layer is capable of operating with a plurality of distinct and parallel second driver layers.

3. A method as defined in claim 2, wherein one of the plurality of distinct and parallel second driver layers is selected from the group consisting of a driver layer specific to a Universal Serial Bus and driver layer specific to a 1394 bus.

4. A method as defined in claim 1, wherein the first driver layer is capable of simultaneously operating with a plurality of distinct devices.

5. A method as defined in claim 1, wherein the driver layer that is specific to the connection comprises a bus connection.

6. A method as defined in claim 1, wherein the driver layer that is specific to the connection comprises a network connection.

7. A method as defined in claim 1, wherein the device commands and data comprise Network Driver Interface Specification object identifiers and data packets.

8. A method as defined in claim 1, wherein the encapsulated device commands and data comprise remote Network Driver Interface Specification messages.

9. A method for creating a device driver that eliminates the need for hardware vendors to write host-based device drivers, the method comprising the steps of:
  abstracting device commands and data into a device-independent format to provide a convention for accessing a device;
  specifying a message set for encapsulating the device commands and data into a connection-independent format;
  establishing a connection-independent driver layer that is capable of receiving the device commands and data in the device-independent format and encapsulating the device commands and data in the connection-independent format using the message set;
  establishing an intermediate driver layer that passes the encapsulated device commands and data, without modification, from the connection-independent driver layer to a connection-specific driver layer; and
  establishing the connection-specific driver layer, wherein the connection-specific driver layer corresponds to a particular connection and is capable of transferring the device commands and data in the connection-independent format through the particular connection.

10. A method as defined in claim 9, wherein the connection-independent driver layer is capable of operating with a plurality of distinct and parallel connection-specific driver layers.

11. A method as defined in claim 9, wherein the connection-independent driver layer is capable of simultaneously operating with a plurality of distinct devices.

12. A method as defined in claim 10, wherein one of the plurality of distinct and parallel connection-specific driver layers is selected from the group consisting of a Universal Serial Bus driver layer, a 1394 bus driver layer, and a network connection driver layer.

13. A method as defined in claim 9, the method further comprising the step of adding a new intermediate driver to the intermediate driver layer in order to support a new connection type, wherein the now intermediate driver operates with the connection-independent driver layer without requiring modification to the connection-independent driver layer.

14. A method as defined in claim 9, the method further comprising the step of altering an existing intermediate driver in the intermediate driver layer, wherein the altered intermediate driver operates with the connection-independent driver layer without requiring modification to the connection-independent driver layer.

15. A method as defined in claim 9, the method further comprising the step of modifying the connection-independent driver layer to introduce additional functionality thereto, wherein the modified connection-independent driver layer operates with the intermediate driver layer without requiring modification to the Intermediate driver layer.

16. A system for abstracting device driver development by layering driver functionality, the system comprising:
  a first driver layer means for receiving device commands and data in a device-abstracted format and for encapsulating the network device commands and data within a connection-independent format;
  a second driver layer means for receiving encapsulated device commands and data, the second driver layer means passing the encapsulated device commands and data, without modification, to a driver layer means that is specific to a connection associated with a particular device.

17. A system as recited in claim 16 wherein the device is a network device.

18. A system as recited in claim 16 wherein the first driver layer means is capable of operating with a plurality of distinct and parallel second driver layer means.

19. A system as recited in claim 16 wherein the first driver layer means is capable or simultaneously operating with a plurality of distinct devices.

20. A system as recited in claim 18 wherein one of the plurality of distinct and parallel second driver layer means is selected from the group consisting of a Universal Serial Bus driver layer, a 1394 bus driver layer, and a network connection driver layer.

21. A system as recited in claim 16 wherein the first driver layer means and the second driver layer means may be updated independently of each other.

* * * * *

UNITED STATES PATENT AND TRADEMARK OFFICE
CERTIFICATE OF CORRECTION

PATENT NO. : 6,633,929 B1
DATED : October 14, 2003
INVENTOR(S) : Jameel Hyder et al.

It is certified that error appears in the above-identified patent and that said Letters Patent is hereby corrected as shown below:

Column 2,
Line 46, after "determine" please delete "the"

Column 4,
Line 56, after "bus-" please delete "nor" and insert -- or --

Column 9,
Line 15, before "intermediate" please delete "a" and insert -- an --

Column 11,
Line 27, after "other" please insert -- than --
Line 63, after "FIG. 6 are" please delete "11"

Column 12,
Line 6, after "other" please insert -- than --
Line 41, after "remote" please delete "NI)IS" and insert -- NDIS --

Column 14,
Line 16, after "wherein the" please delete "now" and insert -- new --
Line 31, after "to the" please delete "Intermediate" and insert -- intermediate --

Signed and Sealed this

Fifteenth Day of June, 2004

JON W. DUDAS
*Acting Director of the United States Patent and Trademark Office*